(12) United States Patent
Mallet et al.

(10) Patent No.: US 8,942,215 B2
(45) Date of Patent: Jan. 27, 2015

(54) SYSTEM AND METHOD FOR TRANSMISSION OF DATA FROM A WIRELESS MOBILE DEVICE OVER A MULTIPATH WIRELESS ROUTER

(75) Inventors: Joseph Robert Wayne Mallet, Kitchener (CA); David Sze, Waterloo (CA); Bogdan Frusina, Kitchener (CA); Hagen Kaye, Waterloo (CA); Arif Hudda, Kitchener (CA); Barry Gilhuly, Waterloo (CA); Robert Flatt, Kitchener (CA)

(73) Assignee: Dejero Labs Inc., Waterloo, Ontario (CA)

( * ) Notice: Subject to any disclaimer, the term of this patent is extended or adjusted under 35 U.S.C. 154(b) by 29 days.

(21) Appl. No.: 13/446,825

(22) Filed: Apr. 13, 2012

(65) Prior Publication Data

US 2012/0260296 A1    Oct. 11, 2012

Related U.S. Application Data

(63) Continuation-in-part of application No. 13/183,652, filed on Jul. 15, 2011.

(60) Provisional application No. 61/364,598, filed on Jul. 15, 2010.

(51) Int. Cl.
*H04W 4/00* (2009.01)
*H04L 12/803* (2013.01)
(Continued)

(52) U.S. Cl.
CPC .......... *H04N 21/6131* (2013.01); *H04L 47/125* (2013.01); *H04N 21/41407* (2013.01);
(Continued)

(58) Field of Classification Search
USPC ................. 370/338, 352, 328, 351, 465, 310; 455/445, 466, 422.1, 414.1; 708/238
See application file for complete search history.

(56) References Cited

U.S. PATENT DOCUMENTS 5,301,242 A   4/1994  Gonzales et al.
5,365,552 A   11/1994 Astle
(Continued)

FOREIGN PATENT DOCUMENTS

WO   2010030489 A2   3/2010

OTHER PUBLICATIONS

Patent Cooperation Treaty, International Search Report and Written Opinion dated Sep. 16, 2013, issued on PCT Application No. PCT/IB2013/000690.

(Continued)

*Primary Examiner* — Chi Pham
*Assistant Examiner* — Alexander O Boakye
(74) *Attorney, Agent, or Firm* — Norton Rose Fulbright Canada LLP

(57) ABSTRACT

There is disclosed a system and method for transmission of multiple data streams from a mobile device to a network. In an embodiment, the system includes a multipath wireless router configured to provide a plurality of network connections including cellular, satellite, or wired Ethernet. An encoding module provided on the mobile device is configured to encode high volume data (e.g. high definition video) recorded by the mobile device into multiple data streams in dependence on the number of network connections available for transmission via the multipath wireless router. The encoding module provided on the mobile device transmits the multiple data streams to the wireless router using Wi-Fi to provide a local, short-hop, high capacity network connection. The plurality of network connections available via the multipath wireless router provides the necessary capacity and reliability to transmit a high volume of data, such as high definition video, virtually live.

10 Claims, 14 Drawing Sheets

(51) Int. Cl.

| | | |
|---|---|---|
| *H04N 21/414* | (2011.01) | |
| *H04L 12/54* | (2013.01) | |
| *H04W 76/02* | (2009.01) | |
| *H04L 12/811* | (2013.01) | |
| *H04N 21/61* | (2011.01) | |
| *H04W 28/08* | (2009.01) | |
| *H04L 12/841* | (2013.01) | |
| *H04L 29/06* | (2006.01) | |
| *H04L 12/853* | (2013.01) | |
| *H04L 12/825* | (2013.01) | |

(52) U.S. Cl.
CPC ............... *H04W28/08* (2013.01); *H04L 47/28* (2013.01); *H04L 69/14* (2013.01); *H04L 12/5692* (2013.01); *H04L 47/2416* (2013.01); *H04W 76/025* (2013.01); *H04L 47/38* (2013.01); *H04W 2/10* (2013.01); *H04L 47/26* (2013.01)
USPC .......................................................... 370/338

(56) References Cited

U.S. PATENT DOCUMENTS

| | | | |
|---|---|---|---|
| 5,566,208 | A | 10/1996 | Balakrishnan |
| 6,111,913 | A | 8/2000 | Murdock et al. |
| 6,459,696 | B1 | 10/2002 | Carpenter et al. |
| 6,754,295 | B1 | 6/2004 | Hartnett |
| 6,999,511 | B1 | 2/2006 | Boice et al. |
| 7,529,230 | B2 * | 5/2009 | Lewis et al. ............ 370/352 |
| 8,121,069 | B2 * | 2/2012 | Lewis et al. ............ 370/328 |
| 8,135,398 | B2 | 3/2012 | Wang et al. |
| 8,639,260 | B2 | 1/2014 | Fox et al. |
| 2004/0045030 | A1 | 3/2004 | Reynolds et al. |
| 2004/0255063 | A1 | 12/2004 | Crinon et al. |
| 2005/0074061 | A1 | 4/2005 | Ribas-Corbera et al. |
| 2005/0113066 | A1 | 5/2005 | Hamberg |
| 2005/0175098 | A1 | 8/2005 | Narasimhan et al. |
| 2006/0221933 | A1 | 10/2006 | Bauer et al. |
| 2007/0021117 | A1 | 1/2007 | McKenna et al. |
| 2007/0249422 | A1 | 10/2007 | Podoloff |
| 2008/0049650 | A1 | 2/2008 | Coppage et al. |
| 2008/0101459 | A1 | 5/2008 | Kwon et al. |
| 2008/0170630 | A1 | 7/2008 | Falik et al. |
| 2008/0221918 | A1 | 9/2008 | Petersen et al. |
| 2009/0061954 | A1 | 3/2009 | Syed |
| 2009/0216910 | A1 | 8/2009 | Duchesneau |
| 2010/0082834 | A1 | 4/2010 | Joung et al. |
| 2010/0142421 | A1 | 6/2010 | Schlicht et al. |
| 2010/0142477 | A1 | 6/2010 | Yokota |
| 2010/0189089 | A1 | 7/2010 | Lynch et al. |
| 2011/0002376 | A1 | 1/2011 | Ahmed et al. |
| 2012/0008560 | A1 | 1/2012 | Lewis et al. |

OTHER PUBLICATIONS

Patent Cooperation Treaty, International Search Report and Written Opinion dated Aug. 25, 2011, issued on PCT Application No. PCT/CA2011/050437.

United States Patent and Trademark Office, Office Action dated May 21, 2014, issued in U.S. Appl. No. 13/183,652.

* cited by examiner

SYSTEM AND METHOD FOR TRANSMISSION OF DATA FROM A WIRELESS MOBILE DEVICE OVER A MULTIPATH WIRELESS ROUTER

CROSS-REFERENCE TO RELATED APPLICATIONS

This application in a continuation-in-part of U.S. patent application Ser. No. 13/183,652, filed on Jul. 15, 2011, which claims the benefit of U.S. Provisional Patent Application No. 61/364,598, filed Jul. 15, 2010, all of which are hereby incorporated by reference.

FIELD

The present disclosure relates generally to the transmission of data streams over a wireless network. More particularly, the present disclosure relates to improving the transmission of a high volume of data from a wireless mobile device over multiple network connections.

BACKGROUND

In the area of video and audio data transmission there are many solutions to handle the loss of information through the delivery process. Typical poor delivery issues are solved today using either retransmission of data, or re-synchronization of the video and audio streams. Also used are buffering methods at the receiver that allow for small delays to access the data to allow for some data loss and slow delivery issues. It is also conceived that by splitting the video transmission into multiple paths that it is much less likely that a transmission failure occurs simultaneously on all paths. Therefore if each path contains enough data to build a video transmission there will generally always be data to display video information. When all paths are fully working then video information increases in quality. These traditional methods continue to be used today when transferring data over networks of all kinds.

More recently, smart phones, super phones, tablets and other mobile devices are being offered with built-in cameras capable of recording video in high definition. While capable of recording in high definition video and storing to local storage on the device such as a solid state drive (SSD), they generally do not have the capacity to reliably transmit live high definition video to a desired destination due to capacity limitations of the connected wireless network. Even the advent of 4G Long Term Evolution (LTE) networks may not be able to consistently and reliably transmit live high definition video due to fluctuations in capacity and the reliability of the network connection. Many of these mobile devices are able to connect to a Wi-Fi network. Wi-Fi is known to have a high bandwidth; however, the range Wi-Fi networks is typically relatively short and connection opportunities can be limited.

SUMMARY

It is therefore desirable to overcome at least one disadvantage of conventional systems and methods for transmission of data signals over a wireless network.

In one aspect there is provided a system for transmission of data signals over a wireless network having: an encoding module for encoding video data into a plurality of buffers for transmission; and a feedback module for processing feedback from one or more sources; wherein the encoding module dynamically alters the amount of data that is encoded into the one or more video buffers based at least in part on the feedback received.

In another aspect there is provided a method for transmission of data signals over a wireless network including: encoding video data into a plurality of buffers; transmitting some of the data; processing feedback from one or mores sources, wherein the feedback relates to delivery parameters; and dynamically altering the amount of data passed into the buffers based at least in part on the data received.

In another aspect there is provided a system and method for transmitting data from a wireless mobile device over a plurality of network connections multiplexed via a connected local WiFi network. In an embodiment, a controller connected to the WiFi network, receives from the wireless mobile device a transmission of one or more streams of data, separates the streams, and routes the streams over the plurality of network connections, each stream on its own path to the Internet or over one or more connected networks.

In another aspect, there is provided a system for transmission of multiple data streams from a mobile device to a network comprising: a wireless router configured to provide a plurality of network connections; and a router module provided on the mobile device, the router module configured to route data recorded by the mobile device into multiple data streams in dependence on the plurality of network connections for transmission to the multipath wireless router.

In another aspect, there is provided a method of transmission of multiple data streams from a mobile device to a network comprising: configuring a wireless router to provide a plurality of network connections; and providing a router module provided on the mobile device, the router module configured to route data recorded by the mobile device into multiple data streams in dependence on the plurality of network connections for transmission to the multipath wireless router.

Other aspects and features of the embodiments herein will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

Figure 1:
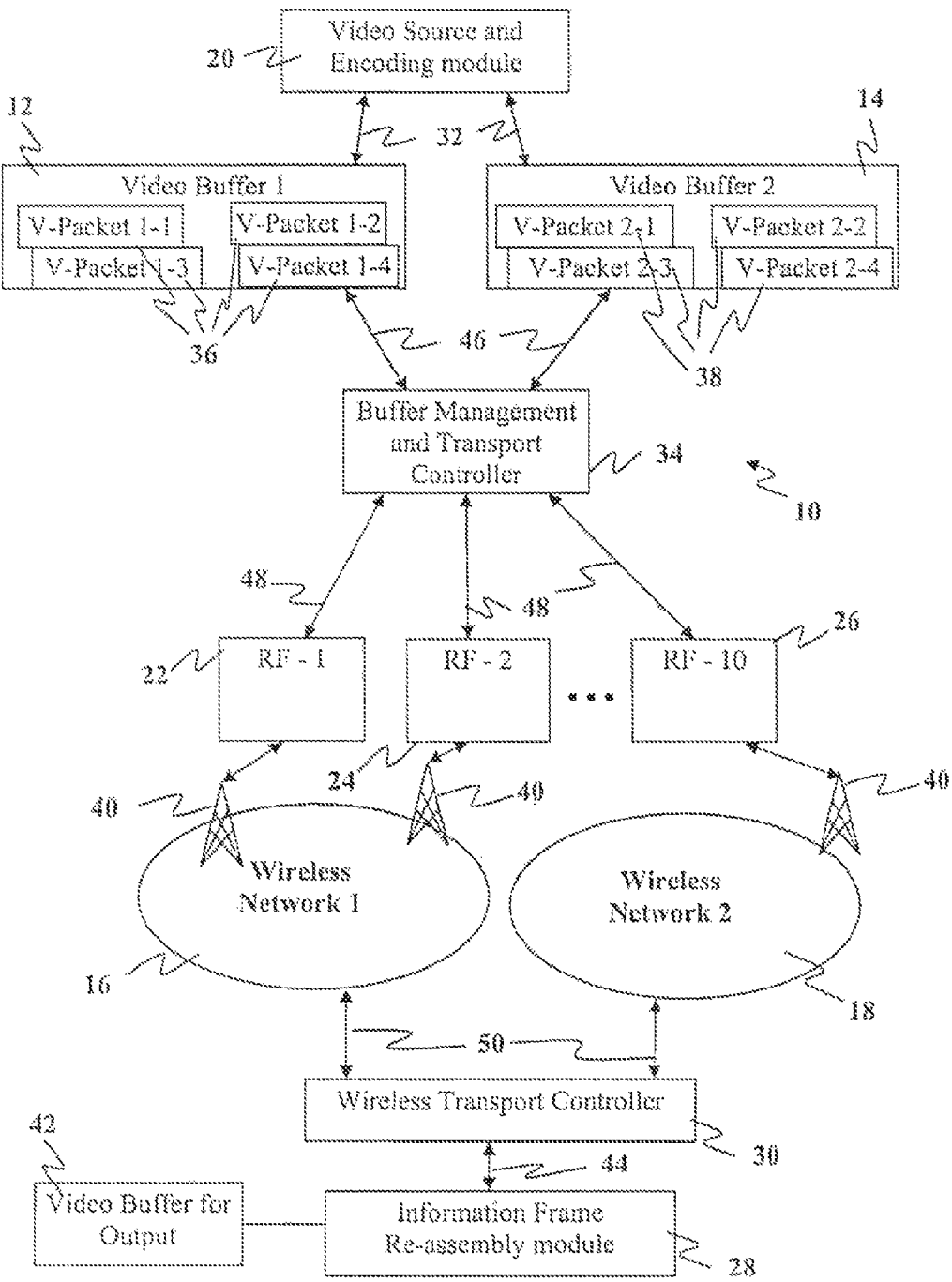
FIG. 1 is a block diagram of an exemplary system for distributing video signals.

Generally, this disclosure relates to a method and system for maintaining improved level of continuity of the data stream when wireless transmission anomalies cause lost, corrupt or delayed data streams, and improving the recording and transmission of live video from a mobile device. The solutions described are intended to reduce the lost, corrupt or delayed data streams which may result in audio and video images that are jumping, broken, corrupt and perhaps even unwatchable.

It is conceived that there are still additional methods required to improve video quality and ensure a continuous stream of audio and video data. The problem with video data transmissions is further exacerbated when transferring broadcast quality video and ultra-high definition video data. In many instances continuity between audio and video frames can be important for the success of data being transferred. In a wireless environment there are additional demands and challenges that require further methods for making video transmission viable.

This disclosure relates in particular to the problem of transmitting audio and video data from a wireless mobile device. This problem differs from most previous work in this area, which has been focused on transmitting video data to mobile viewers. Different solutions are required for transmitting audio and video from a wireless mobile device for at least two reasons. One, transmitting video to mobile viewers is expected to be lossy, with frames dropping out on a regular basis. Many consumer solutions rely on a single radio connection to the Internet. Two, bandwidth is asymmetrical, with the bandwidth down (to the wireless mobile device) typically being many times the available bandwidth from the device. For example, representative numbers in some cases would be approximately 2 Mbps down, 300 Kbps up. This transmission of data from wireless mobile devices includes the transmission of large volumes of data that may be time critical, for example, data transmissions of either normal definition video (720 by 576), high definition video (1920 by 1080), or ultra high definition video (7680 by 4320). The transmission may also include unique environments like real-time news reporting, mobile news, reality television shows, sporting event coverage and a range of similar situation where the information gathered is dynamic and mobile. In these situations a wireless link to a wireless infrastructure may be used by many industries. Such wireless networks include general packet radio service (GPRS), enhanced data for global evolution (EDGE), universal mobile telecommunication system (UMTS), wideband code division multiple access (W-CDMA) and many other 3G or 4G networks. Other wireless networks include WiFi, i.e. 802.11 technology (with all of its various standards), or a newer class of wireless technologies called worldwide interoperability for microwave access (Wi-MAX) and long-term evolution (LTE) that offer even greater throughputs and are intended to aid in delivering data such as television on demand and video conferencing on demand.

In this disclosure, the term video buffer is intended to refer to audio and video encoded data from a source being live, for example a video camera, a high-definition wireless mobile device such as a mobile phone with digital camera capabilities, tablet computers etc., or from a stored source like a disk or other storage media. Packaged information buffers for transmission over a wireless network will be referred to as V-Packets. Also in this disclosure the term mobile transmitter will refer to any sort of wireless mobile device being used to transmit information buffers to a destination.

The present invention utilizes technology for dividing audio and/or video content into multiple data streams. What follows is an explanation of this technology.

FIG. 1 illustrates a block diagram of an exemplary system 10 with multiple information buffers 12, 14 using multiple wireless networks 16, 18 to transmit information. In situations and environments where information is preferably dynamically delivered from mobile locations or devices, a mobile sourced video solution is required. This information or mobile sourced video may have originated from cameras or some other advanced capture method or the information may have been pre-captured and saved to a storage media to be transferred at a later time. After preparing the video data into buffers 12, 14, a steady and continuous flow of buffers May be sent from a mobile transmitter to a receiver via various techniques. The system 10 provides the ability to modify the video quality at the source by adjusting the amount of video information encoded into the buffers 12, 14 at the transmitter as described herein. Video quality can be dynamically adjusted (improved or degraded) in response to feedback from the network both locally and remotely, such as, for example, local queues at the transmitter or the remote receiver.

In the system 10 of FIG. 1, the video source data is prepared for transmission and moved into the video buffers 12, 14 by the Video Source and Encoding module 20, which may contain a storage component used to store data or video information. Many video buffers could be used and the data may be divided between the various buffers. Captured information can include, for example, normal, high or extremely high definition audio and video content. Preparation may include advanced compression (for example moving picture expert group (MPEG) compression), packetization and other processes designed to improve transmission. In some embodiments, video data from a single source, either live or stored, can be divided into multiple video streams using a technique like Multiple Descriptive Coding (MDC). Other techniques can also be used to break the video data stream into different packets for delivery over various links. The division of the data is intended to allow for wireless delivery of data in multiple video buffers 12, 14 over one or more wireless network links, (Radio Frequency-1 (RF-1) 22, RF-2 24 and RF-10 26) over one or more wireless networks 16, 18 to an Information Frame Re-assembly component 28, via a wireless transport controller 30. Each of the processes shown can be executed within one or more computer systems and the division of labor between computer systems may be based on processing unit utilization and network capacity restrictions. Depending on conditions and processing unit availability, a complex video splitting method like MDC can be used or a simple packetization and splitting method could be substituted in its place. Within this encoding stage, the number of frames-per-second (FPS) is determined and the output enables dynamic adjustment of the quantity of information that is placed into the video buffers 12, 14 and subsequently transmitted to the Information Frame Re-assembly component 28.

The linkage 32 between the Video Source and Encoding module 20 and the Video Buffers 12, 14 could be external, for example, over FireWire, a Universal Serial Bus (USB) link, Serial connection, Bluetooth, WiFi wireless link or some other high speed link. Alternatively, in a fully integrated system the Video Source and Encoding module 20 could be together with the Video Buffers 12 and 14 in the same physical housing.

The system 10 includes a Buffer Management and Transport controller 34 which acts as an interface to a plurality Of Radio Frequency (RF) modules 22, 24 and 26. In FIG. 1 only three RF modules are illustrated as RF-1 22, RF-2 24 and RF-10 26, however any number of modules may be included depending on the system. The Buffer Management and Transport Controller 34 accesses and reads portions of data in the Video Buffers 12 and 14. The portions of data labeled as V-Packet 1-1 36 to V-Packet 2-4 38 are created based on various factors including, but not limited to, the packet size restrictions of the wireless networks 16 and 18, other packet transmission results, configuration parameters and other such guidance within the overall system architecture.

The Buffer Management and Transport Controller 34 receives messages from RF modules 22, 24 and 26. The RF modules 22, 24 and 26 can return messages from an Information Frame Re-assembly module 28, via the Wireless Transport Controller 30 and from interactions with one or more Wireless Networks 16, 18 through base stations 40 that are within a coverage region. These messages represent feedback on coverage, congestion, transmission failures with each base station 40 during the process of trying to exchange messages. In turn this information guides the Buffer Management and Transport Controller 34 to decide what quality of video information to packetize, how much information to send and through which RF modules 22, 24 and 26, and through which linkage 48.

Once information is received by the Information Frame Re-assembly module 28, the information is collected into a video buffer for output 42. This buffer could be within the same computer system as the Information Frame Re-assembly module 28 or it could be housed in a separate system through a well-known link, like USB, FireWire or some high speed transfer connection. Linkage 44 between the Wireless Transport Controller 30 and the Information Frame Re-assembly 28 could be over, for example, a high-speed computer bus (multiple CPUs in the same physical housing), or over gigabit Ethernet (TCP/IP) or some other well known coupling method. The wireless transport control has a further link 50, where it is linked to wireless networks within the coverage range. A further linkage is created between the Buffer Management and Transport Controller and the video buffers 46.

Figure 2:
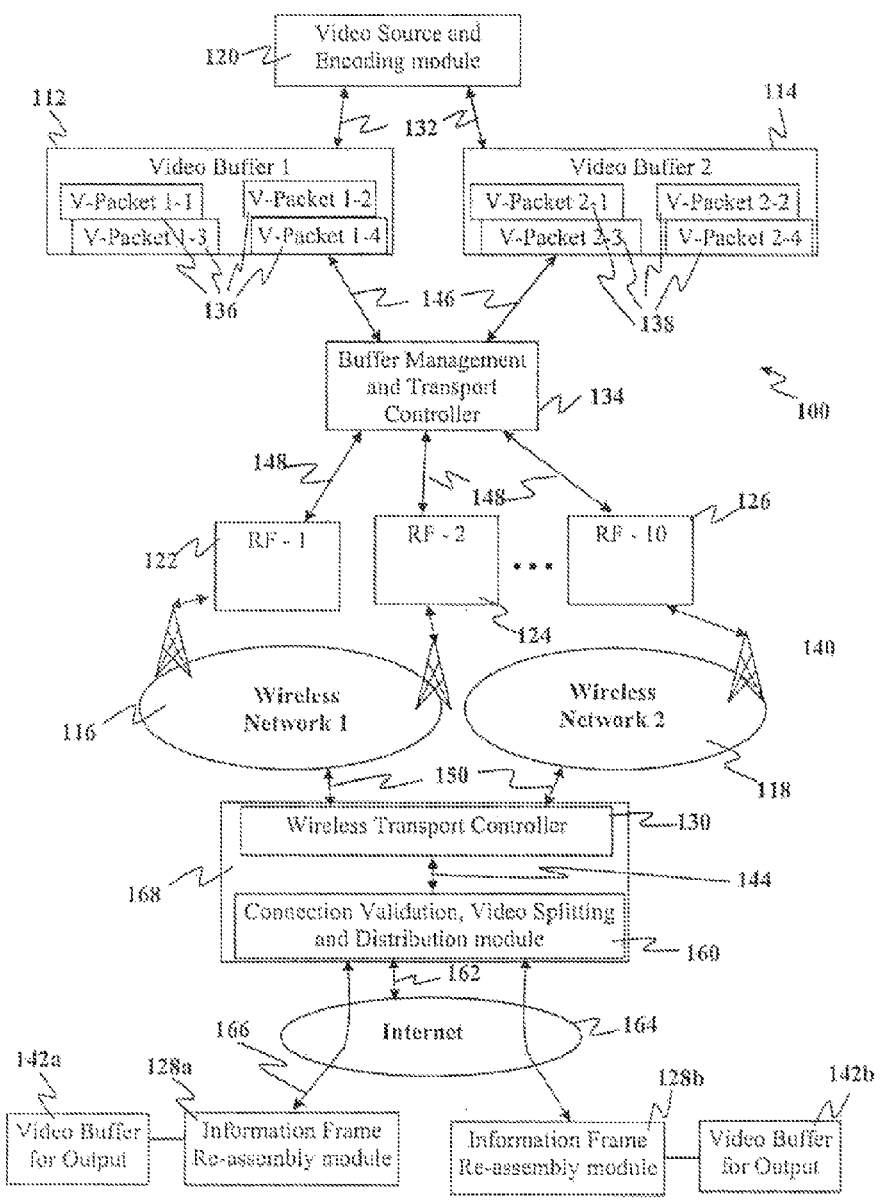
FIG. 2 is a block diagram of another exemplary system.

FIG. 2 illustrates a block diagram of another exemplary system 100 with multiple Video Buffers 112, 114 using multiple wireless networks 116, 118 to transmit, Via a link 150, the video information to a distribution point 168 where it can be split for distribution. In this embodiment a Wireless Transport Controller 130 is coupled with a Connection Validation, Video Splitting and Distribution Module 160 (referred to as a Distribution module 160), via a link 164. The Distribution module 160 acts as a central hub for dealing with the distribution of Video Buffers 112, 114 to a large number of possible Information Frame Re-Assembly components 128a, 128b. This distribution point 168 is coupled to a wide area network like the Internet 164 via any well known high-speed link 162 for example, T1 lines running megabit or gigabit speeds. The distribution point may be directed coupled to at least on Information Frame Re-assembly module through a link 166.

The Information Frame Re-assembly components 128a, 128b could include cable stations, news outlets, Internet content centers, streaming Internet distributors and a wide range of existing and future distribution options. The Information Frame Re-assembly component is also connected to a video buffer 142 which is adapted to output or display the video or other data. In FIG. 2, various elements of the system are consistent to FIG. 1, but the Wireless Transport Controller 130 is centralized in a way that allows received V-Packets 1-1 to 2-4 136, 138 to be split, distributed and seen by a wider audience over a wide area connection network like the Internet 164. Distribution over the Internet 164 allows for quick worldwide distribution, of real-time data from mobile camera collecting news and real-time events throughout the world. Another advantage of this embodiment 168 is that connections can be authorized, paid for and validated at any time. This system may allow new distributions to be more easily added to existing content with less negative impact on the overall system. Connections between the Information Frame Re-assembly components 128a, 128b would take place using common TCP/IP based protocols 166, such as real-time streaming protocol (RTSP) and real-time messaging protocol (RTMP), which are easily able to distribute audio and video content. Such distributions are well known in the industry and have far fewer problems than ensuring the reliability of the data reception over the Wireless Networks 116, 118 that were used to collect the data in the first place.

The centralized Information Frame Re-assembly component allows for remote management and control of the mobile unit. In addition to status information, the central control pushes configuration instructions to the mobile unit, directing operation, which input/output to use, general quality settings, etc. The central control is capable of remotely configuring both the directly connected for example the mobile transmitter or Buffer Management and Transport Controller 134, to the server and those that route through the central systems, for example Information Frame Re-assembly module 128a, 128b.

As in FIG. 1, a Video Source and Encoding module 120 contains data that is distributed to the video buffers 112, 114 through a link 132. The Buffer Management and Transport Controller 134 receives the buffers through a link 146 and distributes the data to a plurality of RF modules 122, 124 and 126. The RF modules 122, 124 and 126 transmit the data to a base station 140 on range of a wireless network 116.

Figure 3:
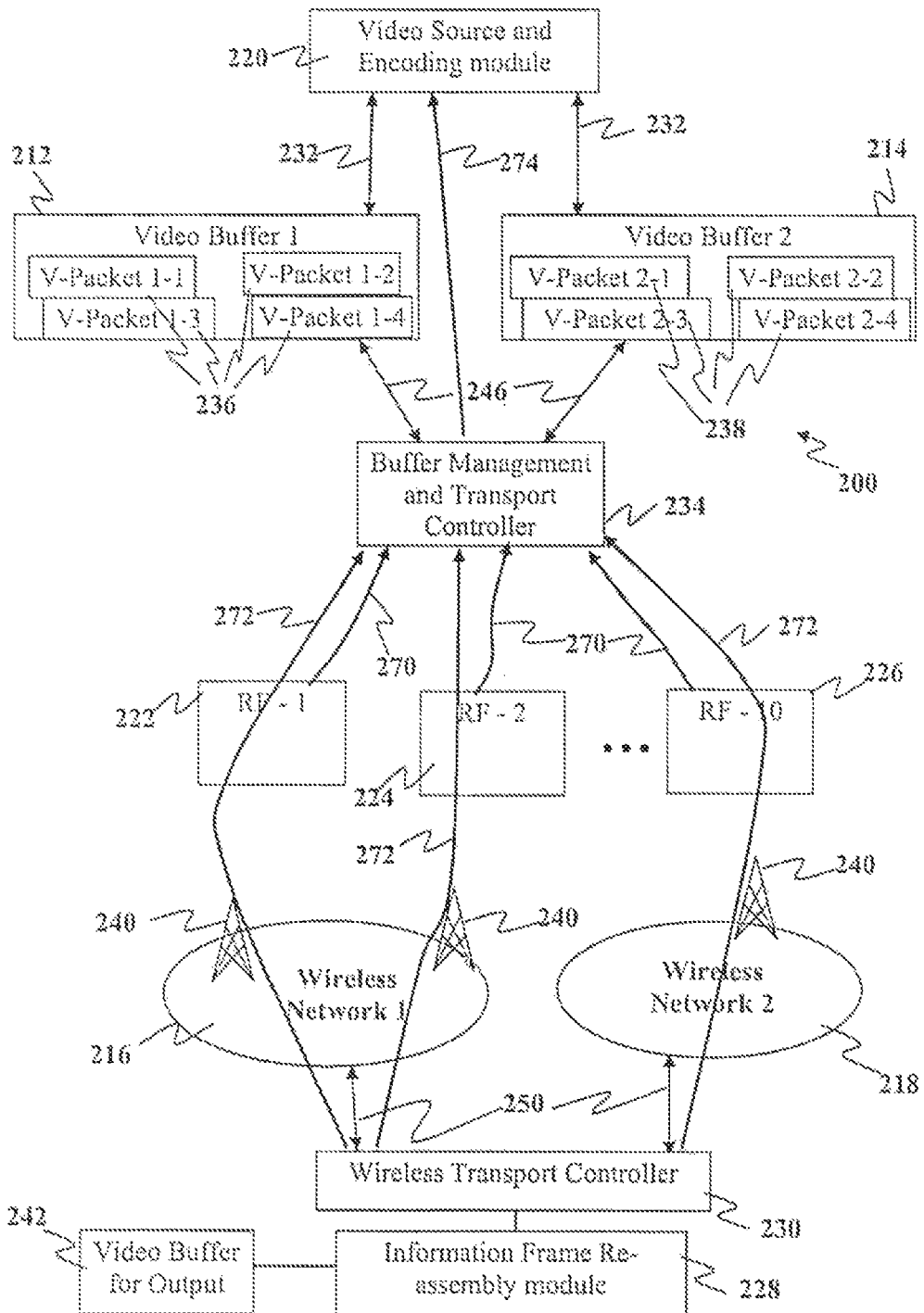
FIG. 3 is a block diagram of yet another exemplary system and feedback that can occur within the system.

FIG. 3 illustrates a block diagram of yet another system 200 and the feedback that occurs within the system 200. The system has a video source encoding module 220 which relays video or other data via a link 232 to video buffers 212, 214. The system 200 further includes a Buffer Management and Transport Controller 234, which access the video buffers 212 and 214 trough a link 246, attempts to deliver V-Packets 1-1 to 2-4 236, 238 to an Information Frame Re-assembly module 228. Various failures and issues may take place along the delivery path. In an exemplary system that uses Wireless Networks 216, 218 as part of the delivery path these failures may increase in frequency and seriousness as compared to a wired connection. In one case, the first set of failures may occur as all attached RF modules 222, 224, 226 attempt to wirelessly transmit the V-Packets 236, 238 to a specific base station 240. Base stations 240 experience frequency congestion issues, as the RF module 222, 224, 226 move, the coverage indications and receive signal strength indicator (RSSI) can show a degradation in link quality and its ability to receive the information. Errors due to spontaneous congestion may occur when an increase of wireless mobile devices wish to transmit at the same time. All of these failures, indicators and congestion issues result in the RF modules, i.e. RF-1 222, RF-2 224 and RF-10 226 sending signals 270 back to the Buffer Management and Transport Controller 234.

For V-Packets 236, 238 that make it across to the base station 240 there is still the transmission of information across the Wireless Network 216, 218. Within the Wireless Network 216, 218 an additional set of failures can occur. These failures can result from congestion issues within the Wireless Network 216, 218, lost packets, damaged packets that can not be understood and a range of other internal issues. As the Information Frame Re-assembly module 228 receives V-Packets 236, 238 it can infer which V-Packets 236, 238 did not make it across the Wireless Network 216, 218. The Buffer Management and Transport Controller 234 can also write a time stamp into each V-Packet 236, 238 just before it performs the transmission to the base station 240. This time stamp can then be used by the Information Frame Re-assembly module 228 to determine how long each V-Packet 236, 238 took to make it across the various hops to reach the base station. This one-way transmit time can then be used to determine if the Wireless Network 216, 218, the base station 240 or the link to the Wireless Network 250 is bottlenecked and may cause unusual delays in reception of the V-Packets 236, 238. This information and statistics regarding the transmission is collected by the Information Frame Re-assembly module 228 and transmitted back as a status message 272 to the Buffer Management and Transport Controller 234. Further status messages may be relayed similarly from the RF modules.

With all this status information 270, 272 returning to the Buffer Management and Transport Controller 234. The Buffer Management and Transport. Controller 234 has the ability to make decisions intended to improve the overall continuity of V-Packet 236, 238 information flow over each attached RF Module 222, 224, 226. Since there can, be any number of RF modules 222, 224, 226, this decision making ability can relate to specific feedback paths. For example throughput calculations for V-Packets 238, which could be sent through RF-10 226 into Wireless Network 2 218 and over link 250, could be taking ⅓ of the time for V-Packets 236 shipped over Wireless Network 1 (216). This information is taken into account when the Buffer Management and Transport Controller 234 merges all feedback information into a common feedback 274 to the Video Source and Encoding Module 220. The Video Source and Encoding Module 220 could be told to limit the amount of video buffer data 212, 214 it generates and stores into the buffer area. Image quality is reduced or degraded or it can be increased and improved in various different ways. Some of these ways include scaling down the image, which results in a generalized loss of quality over the entire frame. Alternatively the amount of video buffer 212, 214 can be reduced by decreasing the encoding bit rate, which tends to affect areas of higher movement or the frame rate can be decreased or increased. By adjusting the encoding and frame rates the number and quality of video images encoded changes, thus affecting the information encoded into the video buffer. A significant decrease in the encoding rate will eventually create a visibly degraded image at the receiving end.

The Buffer Management and Transport Controller, as shown in FIGS. 1, 2 and 3, uses several factors to determine if the capacity of a particular RF channel has changed (either increased or decreased) including, but not limited to, network latency; connection RSSI; packet delivery failure; delivered bit rate compared to sent bit rate; and pending data (backlog).

In regard to network latency, the current network latency is measured by synchronizing the clocks between the client and the server and continuously measuring the delay introduced by the network in delivering all packets. Once the latency is known, the Buffer Management and Transport Controller uses the information to determine whether an RF Connection is behaving well, compared to another connection or compared to the connection itself. For example, if the connection was compared with itself, the current network latency may be compared to the latency in the past X seconds, where X is a predetermined number used for the comparison. A poorly performing connection may have a highly variable latency that increases as the traffic rate increases, or may have a latency that is simply too large for the channel to be useful, for example an approximately 2 second delay in short latency mode with a 1.5 glass-to-glass latency. For instance, each active audio/video stream has an associated end-to-end (or glass-to-glass) latency—the configured time delay between when the image was captured by the camera and when it is actually delivered to the video buffer for output. If the network delay of a particular RF interface increases significantly such that the glass to glass latency is threatened, that RF interface is either deprecated or shut down entirely to prevent the stream from being corrupted. This is particularly an issue for transmissions using an extremely short glass-to-glass latency, for example, less than approximately 2 seconds. Also, during transmission, if the network latency increases beyond a configured tolerance, it is also possible that the RF interface is sending more data than the network is capable of delivering or data is backing up inside the RF interface/network. In this circumstance the Buffer Management and Transport controller may decrease the amount of data the RF interface/network is allowed to transmit. When the latency returns to normal, the Transport control may allow the RF interface to carry more data. The Buffer Management and Transport controller also uses the measured network delay to anticipate lost packets and retransmit them before the output video buffer misses them. If a packet hasn't been delivered and the time passed is longer than the network latency at the time that the RF interface sent it, the packet is considered lost. Also, if the packet is reported lost and the scheduled play time for the packet is close to the network delay of the fastest RF interface, in other words, the RF interface with the lowest network delay, the packet is assumed lost and resent.

Connection RSSI may aid in determining whether a specific channel is actually available.

Packet delivery failure is the rate at which packets are lost when sent via a particular RF interface. The status packets sent back to the Buffer Management and Transport Controller include statistics regarding the number of packets lost in a particular interval. The status packets also identify particular packets not received. These packets are resent in a timely manner to prevent the received stream from failing/breaking up due to missing information (a dropped frame). An increasing packet delivery failure rate is an indicator of an unstable/unreliable RF interface and the associated bit rate must be decreased.

Regarding delivered bit rate compared to sent bit rate, the amount of data sent from the transmitter is compared to the reported volume of data received by the server. The goal ratio for any given period should be close to one which would indicate the server received all of the data sent by the transmitter. In typical operation, a ratio of 90% is enough for a healthy connection. If the ratio is too low, then the network connected to that particular RF interface is not reliably transmitting data as fast as the RF interface is sending it. When this circumstance occurs, the RF interface may decrease its transmission rate and allow the network to catch up. Synchronized clocks may be used for this comparison as the transmitter and receiver are intending to compare equivalent windows in time.

In an alternative embodiment, a mechanism may instruct the network to allocate more bandwidth to the wireless mobile device transmitting data. For example, in a network having a Quality of Service agreement, an indicator or trigger may be included that would indicate the desire to provide greater bandwidth for the ongoing transmission. This added mechanism may require further modification on the typical Quality of Service agreements currently in place.

Pending data (backlog) is the queue of packets awaiting transmission over any of the available RF interfaces. The Transmitter control knows the current transmission rate of all connected/operating RF interfaces. The volume of data to be sent which would include continuous data generated by the source plus any packets that; were detected/reported as lost. The presence of backlog does not necessarily require an immediate adjustment to the encoding bit rate by the Video Source and Encoding Module 220. For longer glass-to-glass latencies, the Information Frame Re-assembly Module 228 will have more audio/video data buffered, which gives the RF interfaces more time to attempt to clear the backlog without a reduction in encoding bit rate.

The audio encoding bit rate is much smaller relative to the flow of video information and is unlikely to have an impact on the system's ability to transmit a data stream. There may be little benefit in attempting to limit the audio signal bandwidth in order to preserve signal integrity.

Many other factors could affect how the Buffer Management and Transport controller 234 sends status signals 274 onto the Video Source and Encoding module 220. The examples provided above are not meant to be exhaustive but representative of possible signals and failures to create feedback in the system. The Buffer Management and Transport controller may further include a storage component where information and other factors relating to the transmission are stored for later analysis.

Figure 4A:
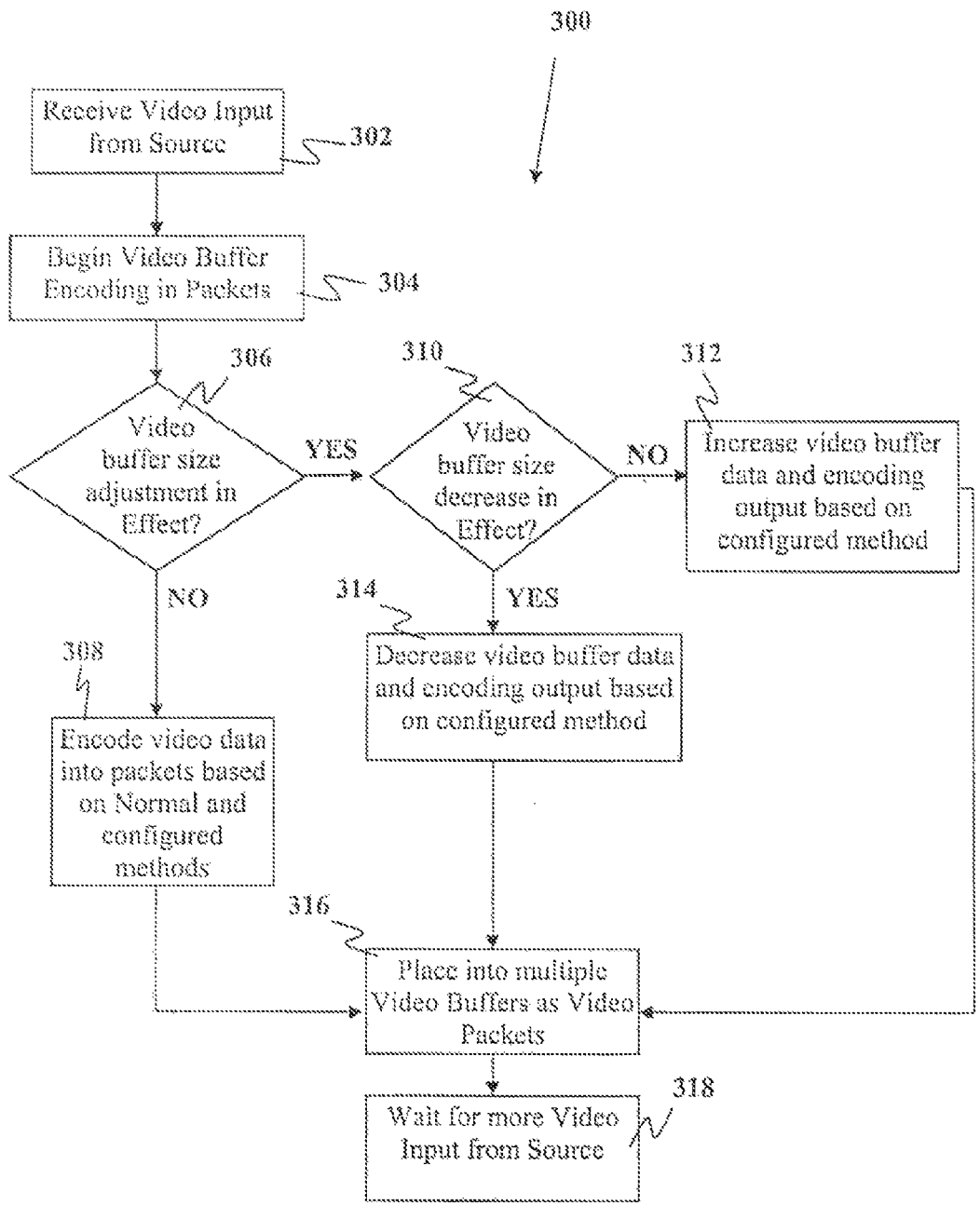
FIGS. 4A and 4B are flow charts showing a method of video source scaling.
Figure 4B:
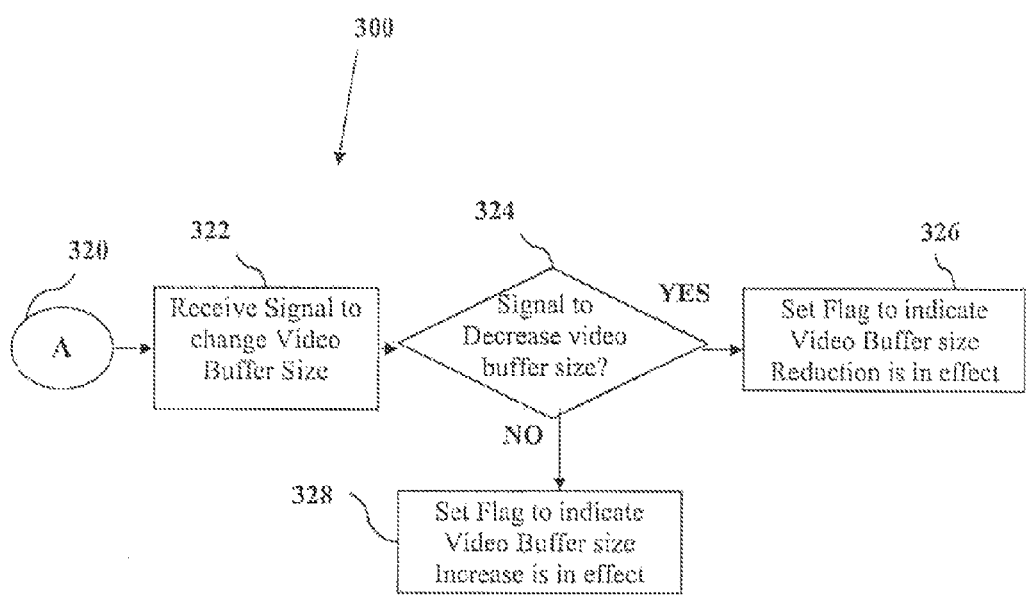

FIGS. 4A and 4B provide a flow chart of a method of video source scaling 300 within the Video Source and Encoding module. This flow chart represents a small part of the overall, functionality of the Video Source and Encoding module. Video input is received from a source 302. As described above, the video input can be from a range of different sources and can be broadcast quality video, high-definition, ultra-high definition or some further large sized video data. At the start of the process the video buffer encoding component 304 takes charge of the data and determines if there is any video buffer size adjustment in effect 306. Dynamic video size adjustment is an exemplary method for increasing or decreasing the amount of data that must be transmitted wirelessly. If video buffer size adjustment is not in effect then regular encoding of the video data takes place 308 into video packets based on the normal and configured methods. As mentioned these methods include, for example, compression, for example, MPEG or other methods, encryption if required and packet splitting to move data through multiple video buffers for different Wireless Networks.

If video buffer size adjustment is in effect then a further check is performed to see if video buffer size should be decreased 310. A video buffer size decrease is not in effect then the video buffer encoding can be increased based on the buffer size adjustment flag. The amount of adjustment is based on the improvements in the parameters being monitored. These parameters can include RSSI, base station saturation values, transmit failures, congestion values through the network, received latency by the remote receiver and many other similar parameters. When these values are analyzed against their previous values all improvements are compared, and a determination is made using high and low water predetermined values. As values increase above thresholds then the amount of data can be increased. The method for increase 312 may follow the configured method used for decreasing the video buffer output. Methods to increase video image data quantity can include methods like: scaling up the image, which results in a generalized improvement of quality over the entire frame, by increasing the encoding bit rate, which tends to improve areas of higher movement, or the frame rate, can be increased.

If a video buffer size decrease is in effect 310 then the amount of data saved into video buffers is decreased 314. This decrease follows the configured method that is being used within the system. As discussed above, the method for decreasing can follow the configured method used for increasing the video buffer output. Methods to decrease video image data quantity can include methods such as scaling down the image, which results in a generalized decrease of quality over the entire frame, by decreasing the encoding bit rate, which tends to negatively affect areas of higher movement, or the frame rate can be decreased which can lead to jumpiness.

Once the amount of encoded data is determined to be unadjusted 308, increased 312 or decreased 314, the data is then placed into multiple video buffers 316. Once the buffers are written the system for transmitting returns to wait for additional video data from the input source 318.

To assist in the determination of when to adjust video buffer output the Video Source and Encoding Controller receives a signal (A) 320 from the Buffer Management and Transport module. The received signal indicates a video buffer size change is required 322. A check is made to determine if the size should be decreased 324. If the size is to be decreased a flag or other indicator is set to indicate that the video buffer output should be reduced 326. Otherwise the flag is set to indicate that video buffer size should be increased 328.

Figure 5:
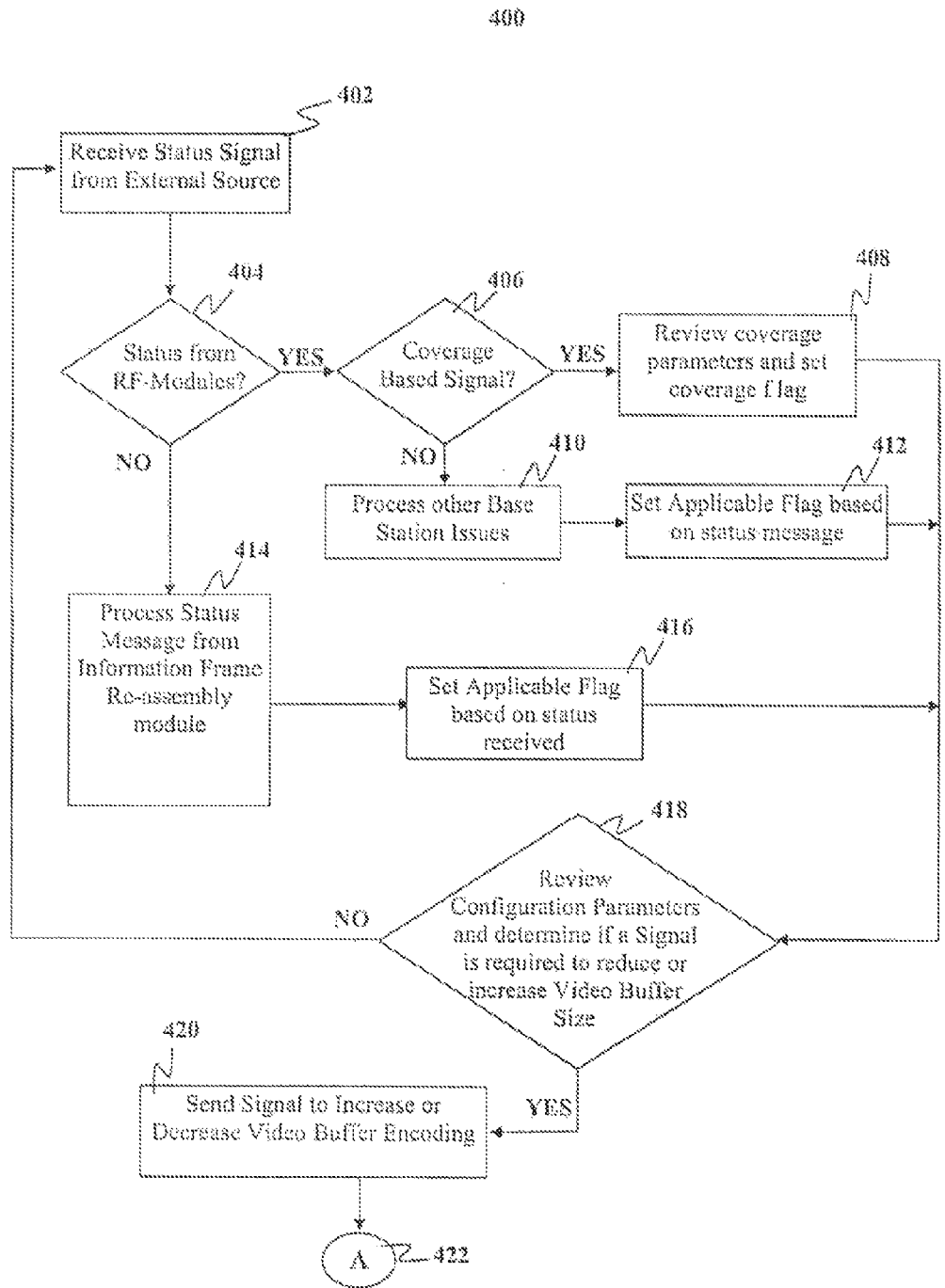
FIG. 5 is a flow chart showing another method of video source scaling.

FIG. 5 provides a flow chart of a method of video source scaling 400 within the Buffer Management and Transport module. This flow chart represents only one aspect of the overall functionality of the Buffer Management and Transport module. First, the Buffer Management and Transport module receives status signal information 402 from an external source. As previously shown, these sources may be RF modules or remote wireless transport controllers. If the status is from an RF-Module 404 then various indicators are checked. There are other possible indicators only a few indicators are shown in this flow chart for readability. Status messages or indicators are feedback that can be related to the current (or active) video stream, client state, network state, remote server/network state and/or wireless status. Current video stream state messages include statistics related to, for example, the current transmission, including received bit rate, sent bit rate, lost packet rate, packet interval times, last sent time, clock status, bytes sent and received, buffer sizes, latency statistics, current length of buffered data, and the current glass to glass delay. Client state messages notify the Buffer Management and Transport controller of configuration changes in the central control. Network state information includes applying weighting to networks which may allow preferential treatment, for example, some networks may be preferred due to cost and/or business agreements. Remote server/network information includes statistics about the endpoint, whether the remote IFR is in use, bandwidth limited, available resources, such as disk space and processing power, and other end point information. Wireless status includes information related to the general health of the connected wireless networks such as reliability, throughput, historical behavior, and configuration.

As an example, the coverage signal RSSI is checked 406 to see if the range has changed considerably. This check can be based on a previously saved value from this RF-Module, it can include a high and low water threshold change value, or that minor changes are ignored. If the coverage indicator has changed significantly for better or worse the coverage parameters are checked 408 and a flag is set to indicate whether the change is significant enough to require amending some transmission parameters. The flag might indicate the level has dropped considerably or has increased considerably, or separate indicators may be used.

If the signal from the RF-Module is not coverage related then a range of other possible base station issues are checked 410. This could include base station congestion factors, transmit failure attempts, dead zone indicators, base station handoff protocols in effect or other such wireless network anomalies. Once these are checked and analyzed the applicable flag is set 412 based on the status message and threshold levels. The flag could indicate conditions have improved or degraded.

If the status message is not from an RF-Module 404 then the status message may be from the Information Frame Reassembly module. This status message could indicate a change in the receive frequency in video packets, either better or worse reception or it could indicate congestion issues have changed for better or worse, or it could indicate many other conditions have changed in packet reception, for example, lost packets, packet delivery rate, current network latency/delay, received bit rate (bps) synchronized with sent bit rate, etc.

Based on the status message and various threshold conditions the theoretical bandwidth of the RF connection is recalculated. If the aggregate calculated bandwidth for all connected RF connections has changed, the applicable flag is set to indicate an improvement or degradation of video buffer transfers 416.

Once this review of the status message is complete and the appropriate indicators have been set, a final review of the system changes is made 418. Within the final check all flags are reviewed against a preconfigured high or low water threshold mark to determine whether a sufficient change in the transmission by the system has been detected. Although a low-water and high-water threshold mark technique is discussed here many other methods could be used to determine whether the detected changes in video buffer transfers are significant enough to alter the video buffer output. Based on this determination a signal to increase or decrease the video buffer output is sent 420 to the Video Source and Encoding module and it connects through (A) 422 to FIG. 4.

As noted above, when wireless mobile devices such as smart phones, super phones, tablets and other mobile computing devices are used as the video recording device for recording a high volume of data (e.g. high definition video), it is generally not possible to stream the data live due to limitations in transmission capacity over conventional network connections. The available networks may be limited to either a single cellular network modem, possibly paired with a built-in local RF network (e.g. Wi-Fi). Even 4G Long Term Evolution (LTE) networks offering significantly higher transmission speeds may not be able to consistently and reliably transmit a high volume of data such as live high definition video due to fluctuations in network capacity and the reliability of the network connection. Also, local RF networks have a limited range and a restricted number of access points.

To address this problem, the inventor has developed a system and method for transmitting data from a wireless mobile device, accessing one or more additional WAN connections via the local RF network, as will now be described in detail. Specifically; in one aspect, an application is provided for an wireless network implemented technology, in which at least one wireless mobile device utilizes a utilizes two or more For understanding the invention, certain definitions are provided.

WAN—Wide Area Network—any connected network with access to the larger Internet. Connection to a WAN can either be wireless (e.g. cellular) or wired (Ethernet).

Local RF Network—A wireless network used to connect nearby devices. The network can be ad-hoc or hosted by a hot-spot. The local RF Network may have a connection to the larger Internet. Wi-Fi (802.11a/b/g/n) is an example of a local RF network.

Router—a component used to direct data packets between networks. Routers generally follow a rule set to determine the destination for any given data packet, typically based on either or both of the data packet source and destination addressing. A Routing Module is a representation of a physical router.

Generally speaking, current wireless mobile devices may have two possible ways to wirelessly transmit data, namely cellular wide area network (WAN) (e.g. 3G+/4G/LTE), or to a local RF network (e.g. Wi-Fi). Some devices have both, while other devices may be restricted to one or the other. Based on currently available technologies, Wi-Fi is generally capable of greater bandwidth, of 10 Mbps, 100 Mbps, or even more. However, the range of Wi-Fi is limited to a local area made available by Wi-Fi hot spots, such as may be found in a home or a business. On the other hand, cellular networks allow a vastly greater area of coverage and extended range, but generally have limited bandwidth.

In order to overcome the limitations of cellular only connections, the present system and method takes a high volume stream of data being recorded by the wireless mobile device and splits the data into a plurality of streams, for example using the methodology as described above. The multiple data streams are transmitted via a local RF network to one or more peer devices (slaves).

The slave devices direct the data traffic to an associated WAN interface. Where the slave device hosts multiple WAN interfaces, a routing utility or module directs the data traffic based on either implicit or explicit instructions from the transmitter. Implicit instructions may be a simple as rules based on packet addressing. In one embodiment of the invention, the routing module may be implemented using an IpTables service, which is built into most Linux distributions. Other embodiments may use network tunneling techniques (PPTP, etc.) to ensure a particular data packet is delivered to the correct WAN interface.

A routing module in accordance with the present invention separates the data packets and directs them to the appropriate WAN interface based on directions from the Buffer Management and Transport Controller. Routing may occur before the local RF interface (see FIG. 7 and FIG. 8), or, when the slave device hosts multiple WAN interfaces, on the slave device itself (FIG. 9).

In one implementation, a WAN Discovery Utility or Module tracks the WAN interfaces (and therefore networks) that are reachable through the local RF interface. By introducing a local RF layer, WAN connections no longer need to be physically connected to the transmitter hardware. This allows an operator to connect to more wireless networks for increased reliability and throughput. The WAN Discovery Module manages the list of WAN connections available on the local RF network. Devices willing to share their WAN capacity identify themselves and are cataloged for use by the Buffer Manager and Transport Controller.

The Buffer Manager and Transport Controller module is responsible for directing the individual data packets to the appropriate WAN interface. All WAN interfaces are treated as separate and distinct connections, operating independent of each other, whether they are hosted on the transmitter, alone on a separate slave, or one of many on a dedicated device.

A Routing Module accepts packets and directs them to the appropriate network based on the addressing information they contain.

The Local RF Interface sends and receives data packets on the local RF network. The local RF network may be connected to the larger Internet allowing a direct connection to receiver where the buffers are reassembled. In most cases, however, the internet is only indirectly available through shared WAN interfaces.

Figure 6:
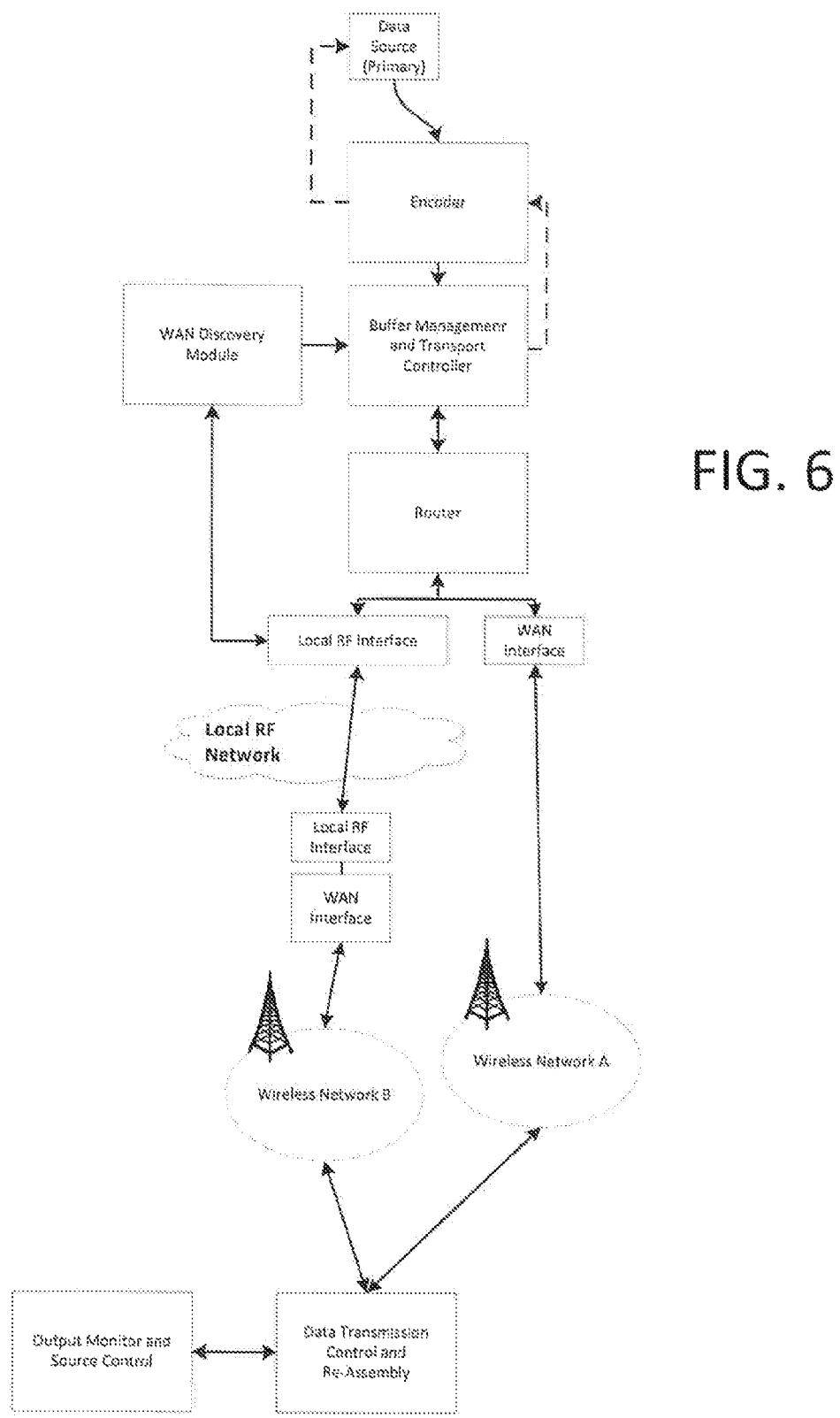
FIG. 6 is a schematic diagram showing a wireless router configuration in accordance with an embodiment.

As shown in FIG. 6, in an embodiment, given a wireless mobile device with both cellular and Wi-Fi capabilities, the wireless mobile device may be configured to use both capabilities to transmit at least two data streams: When transmitted via cellular, the wireless mobile device may use a cellular connection established over a 3G+/4G/LTE network, for example. At the same time, the wireless mobile device may be connected via Wi-Fi to a wireless router that is located within operating range of the wireless mobile device and configured with multiple network connections. The streams are directed to the receiver where the transport buffers are reassembled. When both the cellular and Wi-Fi connections are operating and the wireless mobile device is able to split the data streams over both, the throughput may be sufficient to transmit high quality video live. However, failure of one connection or the other due to a sudden change in network loading could cause the live transmission to be interrupted or to fail outright.

Figure 7:
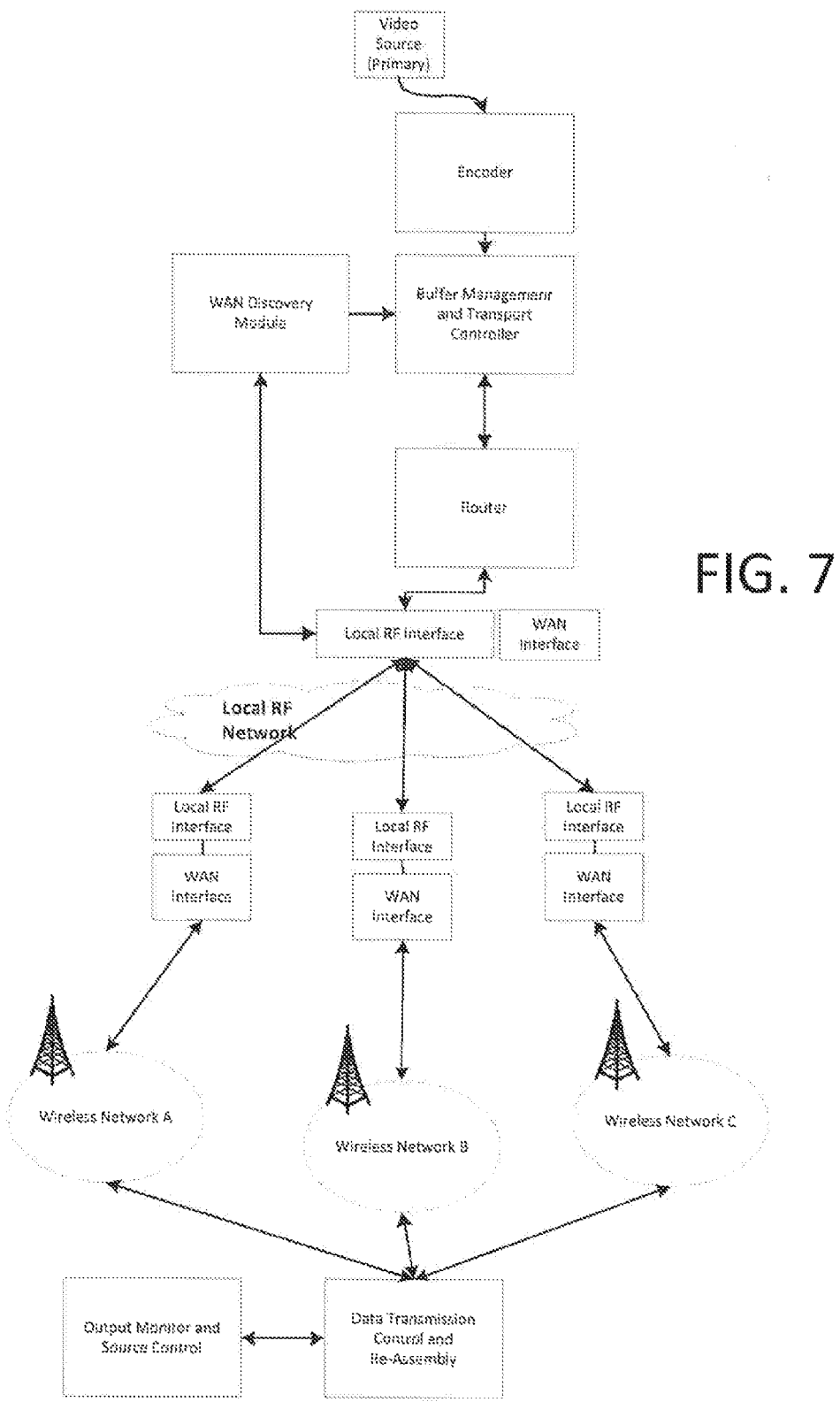
FIG. 7 is a schematic diagram showing a multipath wireless router (MWR) configuration in accordance with an embodiment.

Referring to FIG. 7, the transmitter has identified multiple possible slave devices, each with a single WAN interface available. The transmitter's WAN Discovery Module detects each available WAN and passes the addressing information to the Buffer Management and Transport Controller (BMTC), allowing the BMTC to access them as a virtual WAN interface. The transmitter's Router module divides the data packets and directs each to the appropriate device, for retransmission on the slave's WAN interface.

Figure 8:
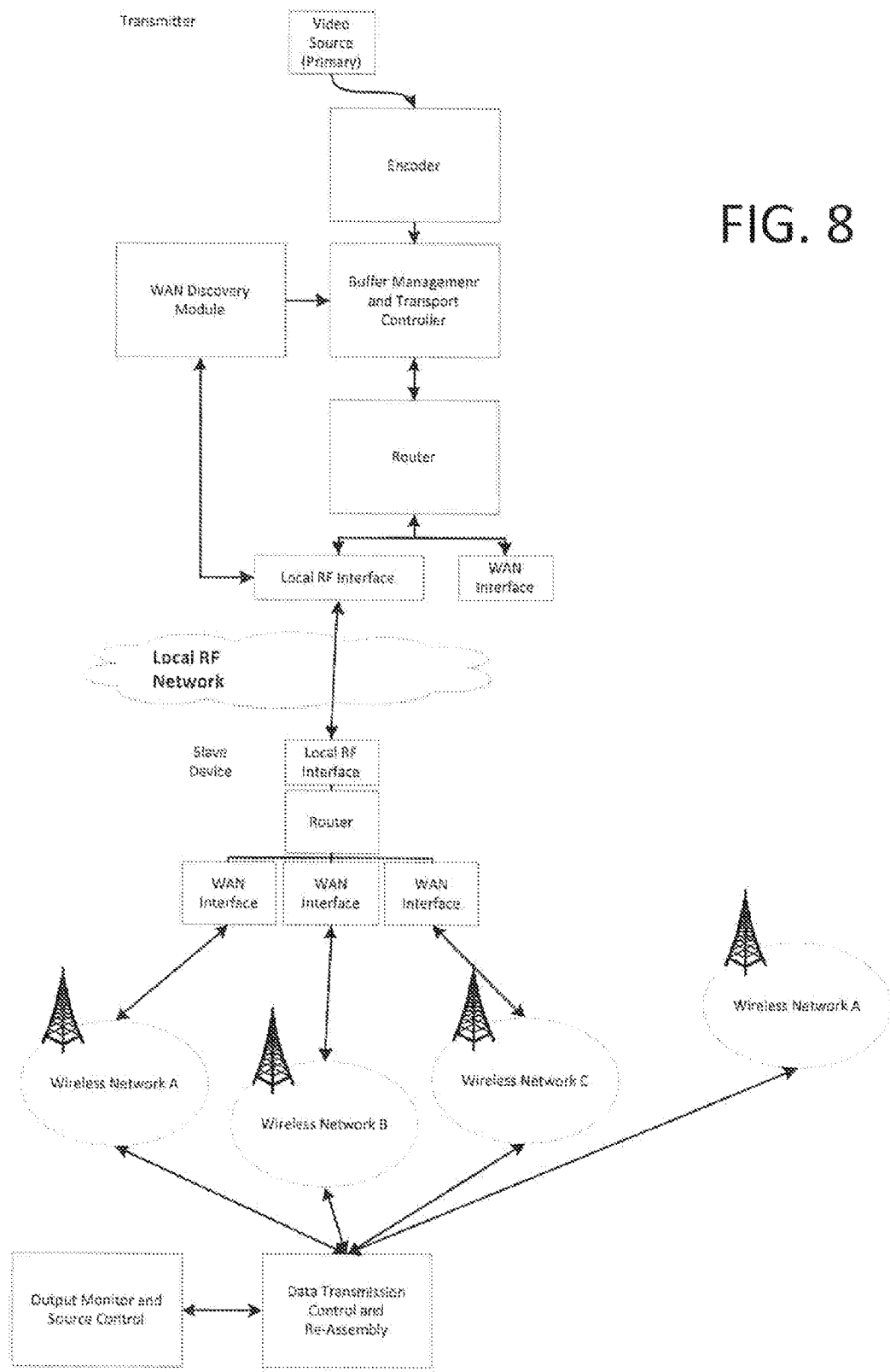
FIG. 8 is a schematic diagram showing an illustrative embodiment in which a multipath slave device is present and able to provide multiple network connections.
Figure 9:
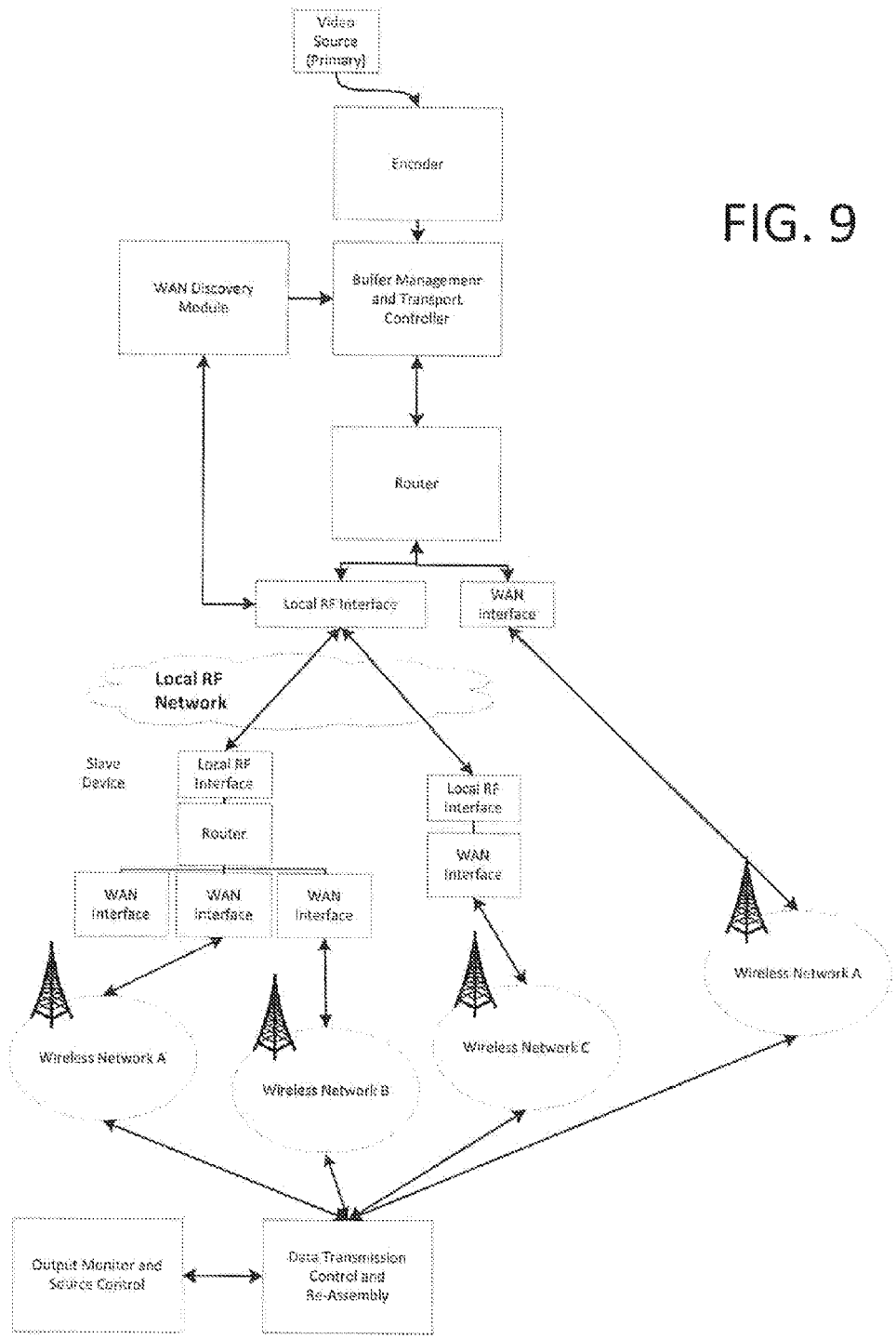
FIG. 9 is a schematic diagram showing an embodiment where both single-path and multi-path slave devices are present.

Now referring to FIG. 8, shown is an illustrative embodiment in which a multipath slave device is present and able to provide multiple network connections. The multipath slave device advertises the available networks and the parameters required to make use of them, possibly through the use of advanced routing protocols. The transmitter's WAN Discovery module detects the WAN interfaces, and passes the appropriate addressing information to the BMTC. The transmitter's router module is effectively in pass-through mode as all data packets are directed through the local RF interface to the slave. The slave hosts a routing module to direct the data packets to the appropriate WAN interface.

FIG. 9 depicts an embodiment where both single-path and multi-path slave devices are present.

The operator has the option of selecting the connection method to use: cell only, Wi-Fi only, or split/shared.

In scenarios where the embedded cell connection is too expensive to use (international roaming), the Wi-Fi connection is preferred. The device uses Wi-Fi only and depends on the MWR to provide network connectivity. Not only does this allow a device not configured for a high-bandwidth plan to broadcast video, but it also works around the cell network lock restriction for those devices that would have to roam.

The information communicated by the slave devices to the encoding module in the wireless mobile device can be used by the encoding module to encode the recorded high definition video into multiple data stream, based on the number of network connections available and the determined transmission capacity of each. Thus, the Wi-Fi connection available on the transmitter is used as a local, high-speed hop to multiple network connections with significantly increased transmission capacity.

In an illustrative application, the multipath slave (MWR) hosts a web server. Once the device has connected to the Wi-Fi interface and acquired an address (via DHCP), it sends a request to the gateway address (the MWR) and queries the current the configuration. The MWR reports the number of connected WANs, identifiers and their capabilities. Each connected WAN is identified by a unique port number. The buffer controller uses this information to configure a (virtual) connection for each WAN connection on the MWR. The port number is used to route specific packets/data from the Wi-Fi interface to a specific WAN via the MWR. (Illustrated in FIG. 11). Data packet flow is bi-directional: once a route is established outbound (from the transmitter through the MWR WAN interface), any packets received by the MWR WAN interface are returned to the originating address at the transmitter.

Figure 10:
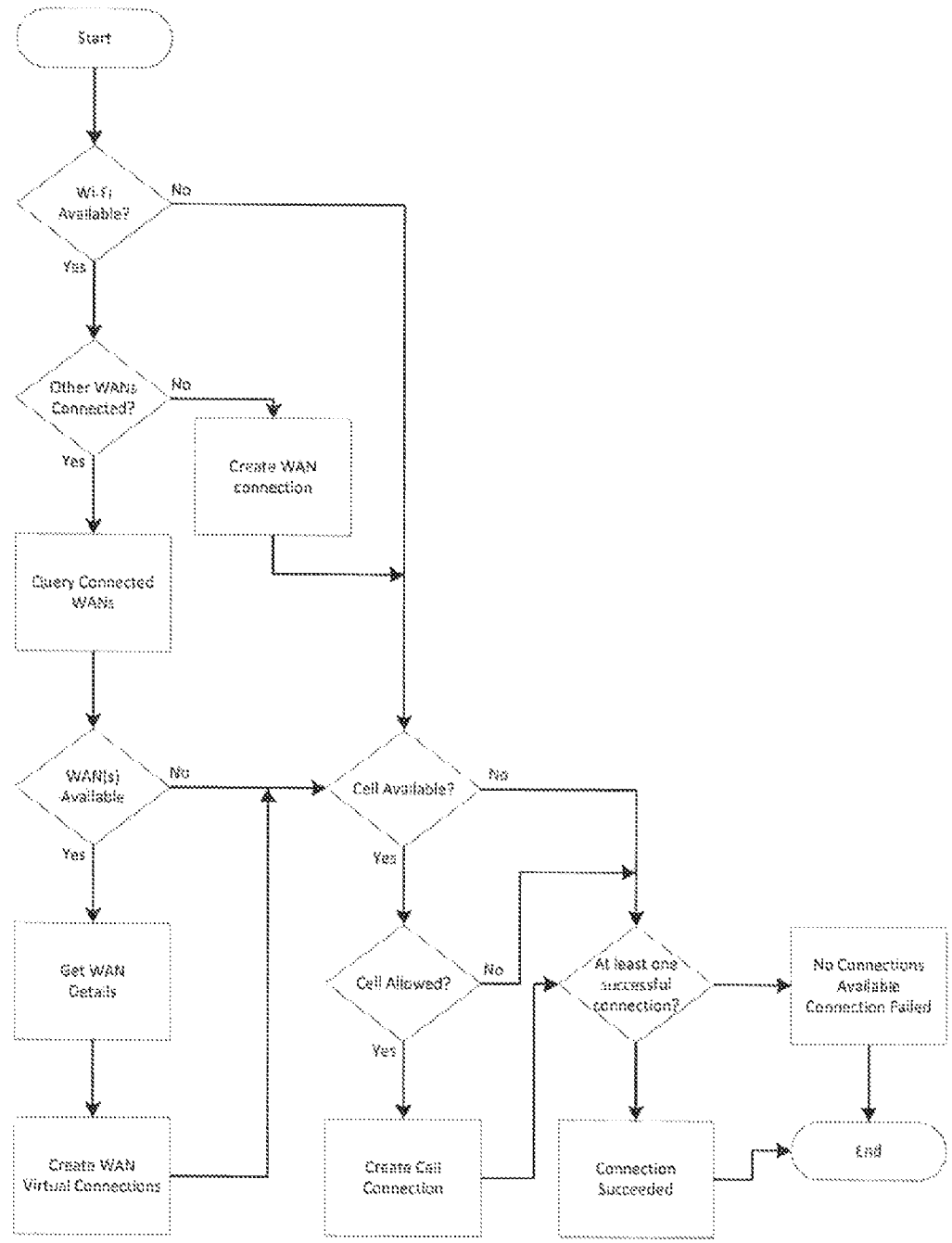
FIG. 10 is a schematic diagram showing a transmitter going through a number of steps to establish the availability of remote WAN interfaces.

Referring to FIG. 10, the transmitter goes through a number of steps to establish the availability of remote WAN interfaces.

The wireless mobile device detects whether there is an available Wi-Fi network. If there is one (the device has connected), the device queries the gateway for connected WAN information. This query also implicitly identifies whether the gateway is a MWR device or just a regular Wi-Fi WAN router. If the Wi-Fi is not a MWR, treat it as a regular connection and continue.

If the Wi-Fi is hosted by an MWR, query the available WANs. For each WAN, create a virtual connection identified by the routing information provided by the MWR. For each virtual connection, an internal stream is created.

When encoding starts, the mobile unit first verifies the available bandwidth on each connection. The connection test measures available bandwidth, transmit latency (one way network delay from the mobile unit to the receiver), and lost data. Based on these parameters, a connection suitability and ideal rate is established. The data buffers are coded with the WAN identifier, which enables connection specific routing on the MWR. The MWR is responsible for splitting the aggregate stream into its component streams and directing each one to the appropriate WAN.

Each virtual connection and therefore, each WAN, is evaluated independently for transmitter suitability. As congestion builds on one of the networks, the Buffer Manager is responsible for shift the traffic to another connection and/or reducing the quality and/or quantity of transmitted data overall.

Figure 11:
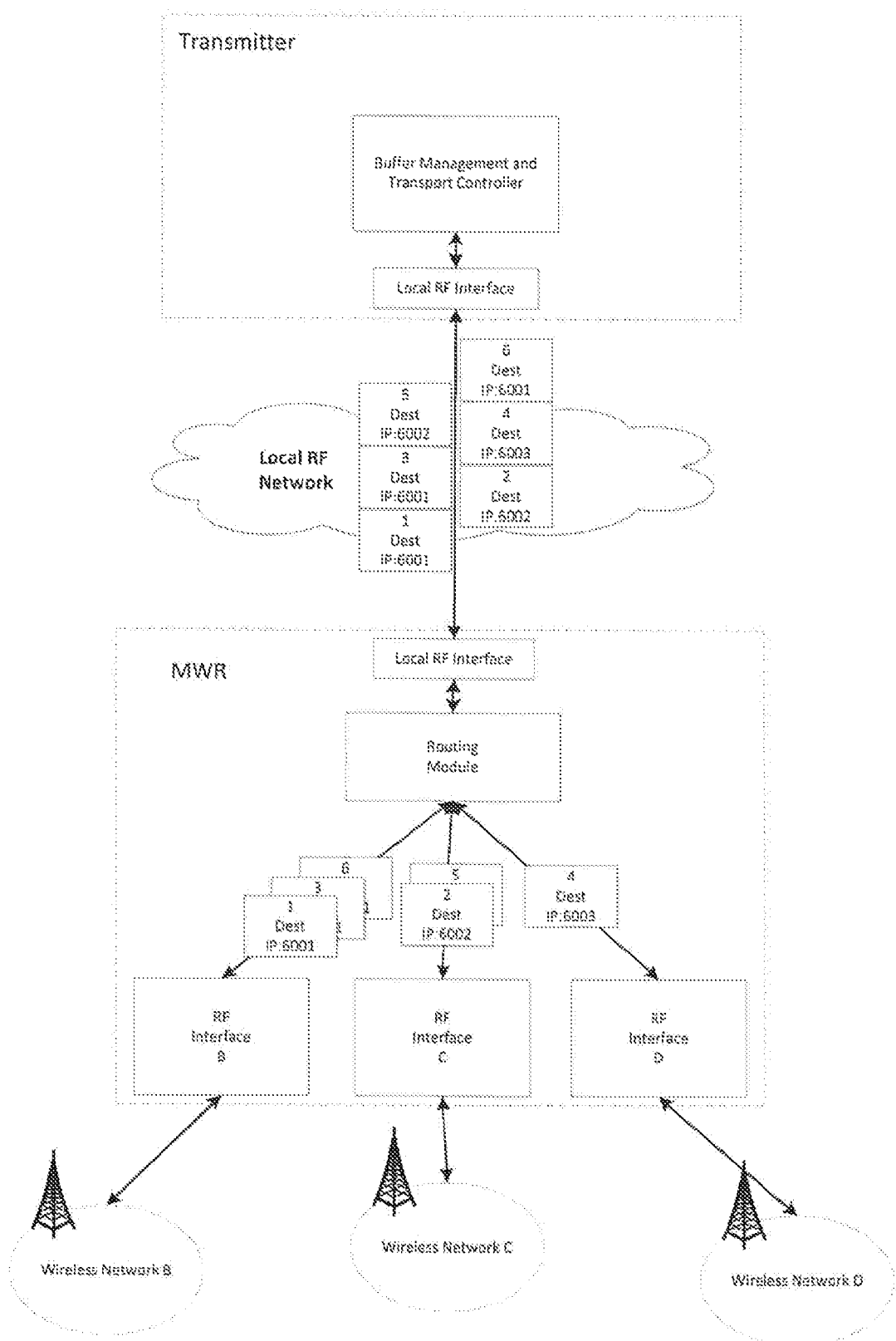
FIG. 11 is a schematic diagram of an illustrative embodiment in which there are no cellular networks directly available and three networks, and Networks A, B and C connected to the MWR.

Referring to FIG. 11, in an illustrative embodiment, there are no cellular networks directly available and three networks, Networks A, B and C connected to the MWR. When queried, the MWR instructs the mobile unit to create three connections, and to use the source address ports of 6001, 6002 and 6003 to identify each stream.

The mobile unit starts transmitting data packets, each addressed to an individual network. The MWR handles the address translation and routing based on the specified port in each individual packet. The traffic for each network is fully independent, only sharing the Wi-Fi interface bandwidth. Since the available Wi-Fi bandwidth is (or should be) greater than the aggregate bandwidth available through the connected WANs, there is little contention for local network resources.

The Buffer Manager is constantly monitoring the one way network latency of all connections. If that latency passes a threshold, or if data directed through a particular interface is not received at the receiver (Data Re-assembly module), the data rate for that connection is decreased or possibly even halted. If this occurs, the excess data packets are sent via one of the other networks (C or D). If necessary, the Buffer Manager reevaluates the current transmission bit rate and may decrease it if necessary (or make other quality/quantity changes—for example, decreasing the video resolution or, altering the recorded frame rate.

In an embodiment, if there is an active cellular connection on the wireless mobile device, one of the encoded data streams may be directed to use the cellular connection. The remaining data streams are sent to the MWR via the Wi-Fi connection. Upon receipt at the MWR, the data streams are separated and directed to the specified WAN based upon the address in each packet. The network connections used may be based considerations of reliability, capacity, and/or operator preference. For example, operator preference may allow the owner of the wireless mobile device to rank possible networks by cost of operation. However, the encoding module may be configured to override the operator's preferences based on transmission requirements for a particular data stream. If the operator has ranked the possible network connections based on cost concerns (e.g. perhaps specifying Wi-Fi only), the encoding module preferentially uses low cost networks first, only using the other network connections as may be necessary to maintain reliability and throughput. This becomes more important, for example, when a combination of cellular and satellite connections are available on the MWR, allowing the use of the cellular networks first, and only using significantly more expensive satellite links when necessary.

Illustrative Use Cases

As an illustrative use case, a reporter might test out her iPhone™ as a video recording device at the office before heading out to a location, and find that the available Wi-Fi network is sufficient to transmit a broadcast quality picture. However, when she heads out to capture some images on location at an event, she may find that Wi-Fi is unavailable, and the cellular network may be overloaded with wireless traffic and only capable of delivering 500 Kbps. Thus, it may be impossible to provide a live picture on location.

If instead she took along a compact wireless router, she could connect through Wi-Fi as well to another cellular network and gain another 500 Kbps. The transmitter software on the iPhone splits the traffic over both connections allowing a much greater throughput than either of the connections alone. All traffic is reassembled at the reporter's office for direct injection into the broadcast studio. In theory, 1 Mbps should be enough bandwidth to transmit a decent quality picture, but with a high volume of data and network latency swinging wildly, the transmitted video may include frequent breakups and on-screen artifacts such as visible macro-blocking.

Figure 13:
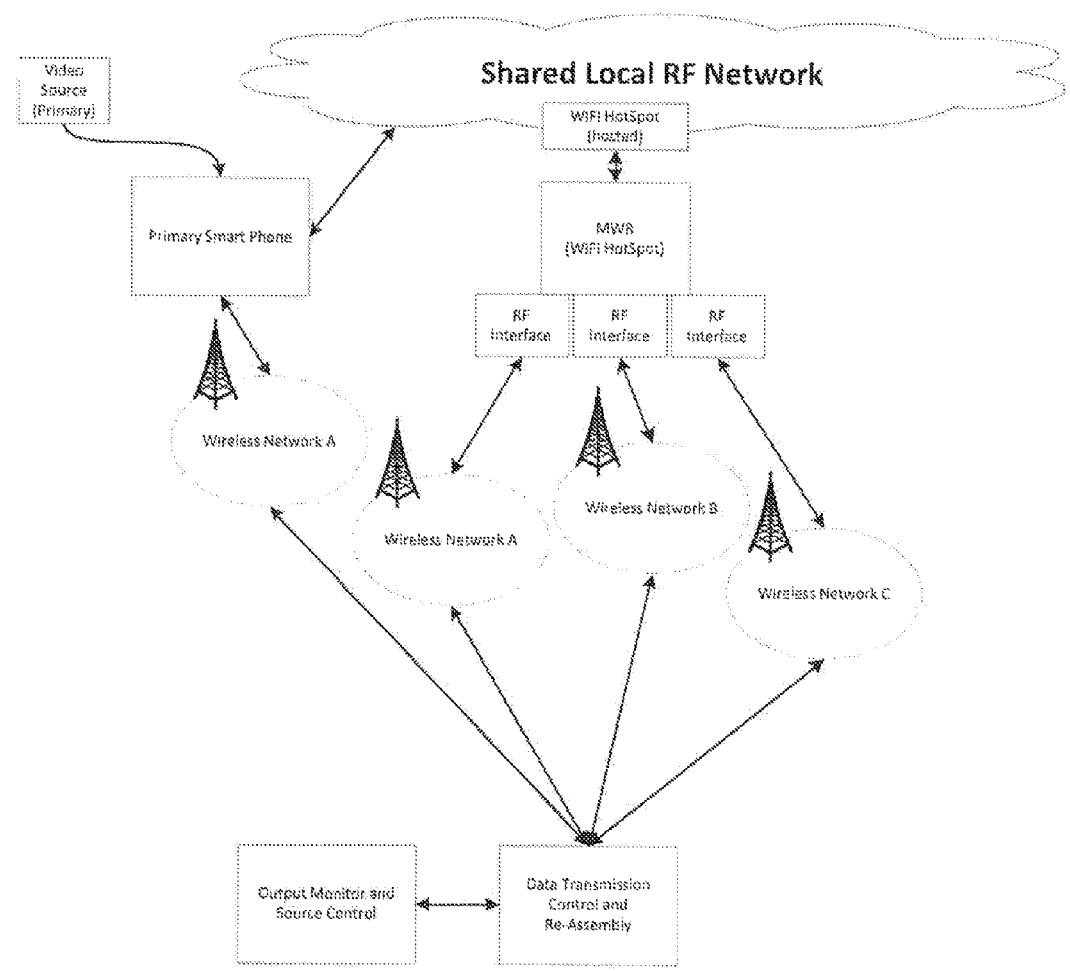
FIG. 13 is an illustrative example of a reporter using an MWR for multiple redundant connections.

Needing the redundancy of multiple connections, the reporter could instead take along a multipath wireless router or MWR as described above (FIG. 13). The MWR could be left in a vehicle located near the site where the MWR would be safe, and connected to the vehicle's battery or another power supply. Connected to the MWR are three cellular modems, each of which appears as a virtual extension and as an available route to the Internet. When the reporter's iPhone connects to the MWR via Wi-Fi, the iPhone can retrieve the additional routing information and sets up four separate routes to available network connections: one for the internal cellular connection in the iPhone, and one for each of the network connections available on the MWR. The traffic over each connection is, once again, routed back to the reporter's studio, where they are reassembled into video for broadcast. With these additional connections, she is able to connect to four different networks, with approximately 2 Mbps total throughput. The four network connections now provide more than enough bandwidth to record the event and transmit it live, despite the heavy local traffic.

In another example, a blogger has travelled to the US from Europe to cover the upcoming election. For portability, he brought his iPhone to film the crowds and some of the speeches. However, his iPhone is SIM locked to his European carrier and transmitting streaming video at any bandwidth while roaming is prohibitively expensive. Fortunately, the local news outlet offers locally configured MWRs. The blogger signs one out and travels to the conference.

At the conference, he instructs the iPhone application to use low-cost mode (Wi-Fi only) and disallows broadcasting on the built-in cellular modem. The iPhone connects to the MWR where there are three networks available, giving more than enough bandwidth and redundancy for a reliable live shot. Data over each of the networks is directed to a webserver where they are reassembled and the resulting video streamed live to the Web.

The blogger also retains his usual phone number, ensuring he doesn't need to distribute another contact number while travelling.

In another example, an employee has a smart phone for personal use. His employer sends him out to inspect an equipment installation and report the progress live. Instead of providing another phone, the employer gives the employee and MWR configured for the available networks.

In another example, a security company installs an MWR in a central location on a client premises and several low-cost cameras with a small video processor and Wi-Fi combination attached (similar to the Raspberry PI demonstration board). The camera units all make use of Wi-Fi and the MWR to transmit live footage of the grounds to the monitoring center. The MWR provides easy installation and connection redundancy.

Figure 12:
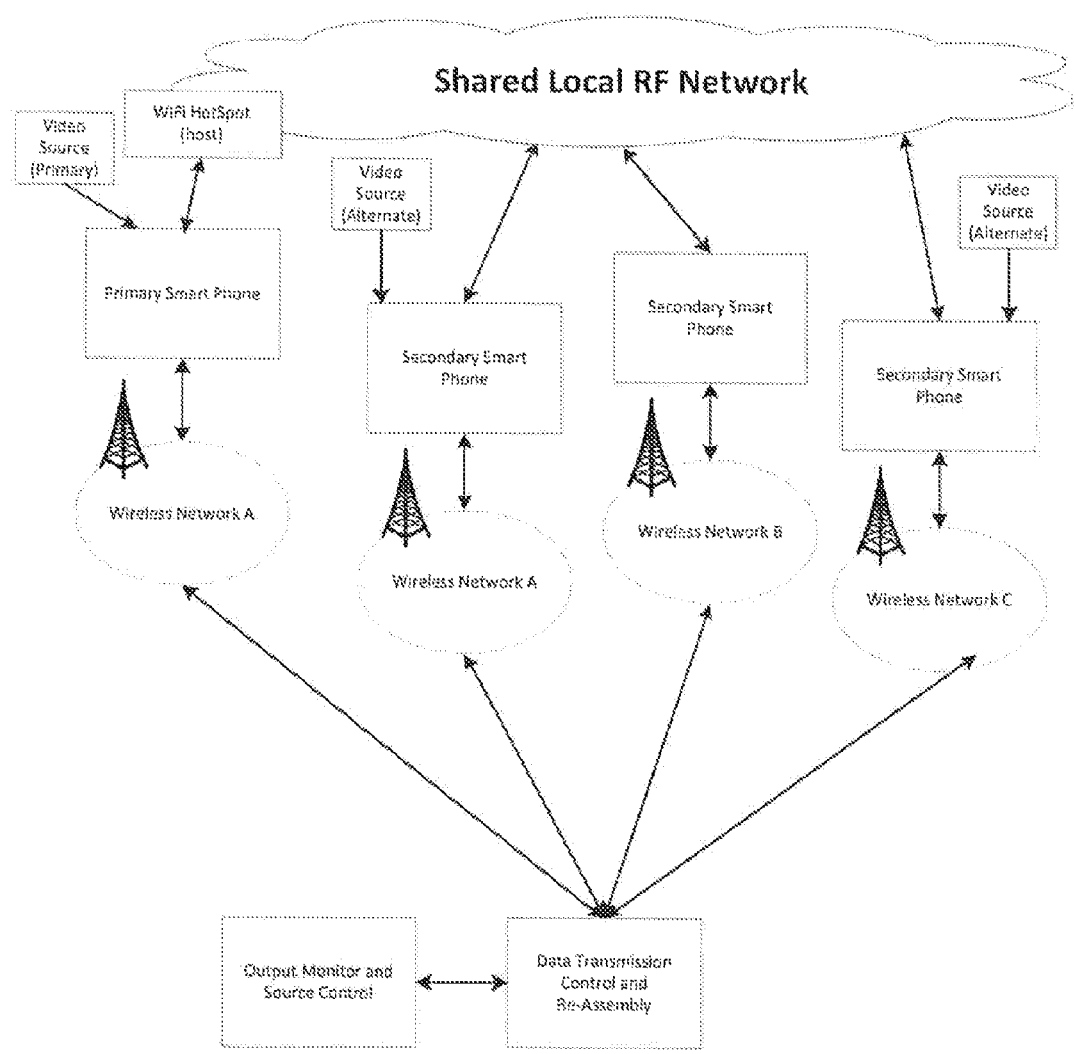
FIG. 12 is an illustrative example of groups of teenagers all attending a local concert.

In another example (FIG. 12), a group of teenagers are all attending a local concert. As amateur film directors, they've entered into an agreement to film a portion of the concert live. Each is carrying a smart phone with necessary client software installed. They turn on their devices, and one becomes the primary transmitter. The other phones connect to it (and to each other) via an ad hoc and private Wi-Fi network. The primary starts recording, with the software automatically dividing the resulting stream and transmitting a portion to each of the connected slaves. Each slave then resends the data over its WAN interface to a server in the cloud where the video stream is reassembled. The resulting stream is available live to the teenager's peers. The server also archives the stream for submission to one of the social networks. The encoding quality is much high than would be possible with a single smart phone connection, and far more reliable.

In the preceding description, for purposes of explanation, numerous details are set forth in order to provide a thorough understanding of the embodiments. However, it will be apparent to one skilled in the art that these specific details may not be required in cell embodiments. In other instances, well-known electrical structures and circuits are shown in block diagram form in order not to obscure aspects of the embodiments. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Thus, in an aspect, there is provided a system for transmission of multiple data streams from a mobile device to a network comprising: a wireless router configured to provide a plurality of network connections; and a router module provided on the mobile device, the router module configured to route data recorded by the mobile device into multiple data streams in dependence on the plurality of network connections for transmission to the multipath wireless router.

In an embodiment, the router module provided on the mobile device transmits the multiple data streams to the wireless router using Wi-Fi.

In another embodiment, the plurality of network connections comprises one or more or cellular, satellite, and wired Ethernet connections.

In another embodiment, the mobile device further includes a cellular network connection, and the router module is configured to route the data recorded by the mobile device into multiple data streams in further dependence on the cellular network connection.

In another embodiment, the router module is configured to route data into multiple data streams in dependence upon the cost of the plurality of network connections for transmission to the multipath wireless router.

In another embodiment, the router module is configured to route data into multiple data streams in dependence upon the bandwidth of the plurality of network connections for transmission to the multipath wireless router.

In another embodiment, the router module is configured to route data into multiple data streams in dependence upon the reliability of the plurality of network connections for transmission to the multipath wireless router.

In another aspect, there is provided a method of transmission of multiple data streams from a mobile device to a network comprising: configuring a wireless router to provide a plurality of network connections; and providing a router module provided on the mobile device, the router module configured to route data recorded by the mobile device into multiple data streams in dependence on the plurality, of network connections for transmission to the multipath wireless router.

In an embodiment, the method further comprises using the router module provided on the mobile device to transmit the multiple data streams to the wireless router using Wi-Fi.

In another embodiment, the plurality of network connections comprises one or more or cellular, satellite, and wired Ethernet connections.

In another embodiment, the mobile device further includes a cellular network connection, and the method further comprises configuring the router module to route the data recorded by the mobile device into multiple data streams in further dependence on the cellular network connection.

In another embodiment, the method further comprises configuring the router module to route data into multiple data streams in dependence upon the cost of the plurality of network connections for transmission to the multipath wireless router.

In another embodiment, the method further comprises configuring the router module to route data into multiple data streams in dependence upon the bandwidth of the plurality of network connections for transmission to the multipath wireless router.

In another embodiment the method further comprises configuring the router module to route data into multiple data streams in dependence upon the reliability of the plurality of network connections for transmission to the multipath wireless router.

The above-described embodiments are intended to be examples only. Alterations, modifications and variations can be effected to the particular embodiments by those of skill in the art without departing from the scope of this disclosure, which is defined solely by the claims appended hereto.

What is claimed is:

1. A system for transmission of multiple data streams from a mobile device to a network comprising: a wireless router configured to provide a plurality of network connections; and a router module provided on the mobile device, the router module configured to route data recorded by the mobile device into multiple data streams in dependence on the plurality of network connections for transmission to the multipath wireless router; wherein the router module is configured to route data into multiple data streams in dependence on a cost of the plurality of network connections for transmission to the multipath wireless router; and wherein the router module is further configured to route data into multiple data streams in dependence on a bandwidth of the plurality of network connections for transmission to the multipath wireless router.

2. The system of claim 1, wherein the router module provided on the mobile device transmits the multiple data streams to the wireless router using Wi-Fi.

3. The system of claim 1, wherein the plurality of network connections comprises one or more of cellular, satellite, and wired Ethernet connections.

4. The system of claim 1, wherein the mobile device further includes a cellular network connection, and the router module is configured to route the data recorded by the mobile device into multiple data streams in further dependence on the cellular network connection.

5. The system of claim 1, wherein the router module is configured to route data into multiple data streams in dependence upon a reliability of the plurality of network connections for transmission to the multipath wireless router.

6. A method of transmission of multiple data streams from a mobile device to a network comprising: configuring a wireless router to provide a plurality of network connections; and providing a router module provided on the mobile device, the router module configured to route data recorded by the mobile device into multiple data streams in dependence on the plurality of network connections for transmission to the multipath wireless router; wherein the router module is configured to route data into multiple data streams in dependence on a cost of the plurality of network connections for transmission to the multipath wireless router; and wherein the router module is further configured to route data into multiple data streams in dependence on a bandwidth of the plurality of network connections for transmission to the multipath wireless router.

7. The method of claim 6, further comprising using the router module provided on the mobile device to transmit the multiple data streams to the wireless router using Wi-Fi.

8. The method of claim 6, wherein the plurality of network connections comprises one or more of cellular, satellite, and wired Ethernet connections.

9. The method of claim 6, wherein the mobile device further includes a cellular network connection, and the method further comprises configuring the router module to route the data recorded by the mobile device into multiple data streams in further dependence on the cellular network connection.

10. The method of claim 6, further comprising configuring the router module to route data into multiple data streams in dependence upon a reliability of the plurality of network connections for transmission to the multipath wireless router.

* * * * *